United States Patent [19]
Dreibelbis et al.

[11] Patent Number: 5,000,899
[45] Date of Patent: Mar. 19, 1991

[54] SPANDEX FIBER WITH COPOLYMER SOFT SEGMENT

[75] Inventors: Richard L. Dreibelbis, Waynesboro; Nathan E. Houser, Afton, both of Va.

[73] Assignee: E. I. Du Pont de Nemours and Company, Wilmington, Del.

[21] Appl. No.: 199,088

[22] Filed: May 26, 1988

[51] Int. Cl.$^5$ .................... D01F 6/78; C08G 18/12; C08G 18/48; C08G 18/76

[52] U.S. Cl. .................... 264/205; 264/210.8; 264/211.14; 525/410; 528/61; 528/64; 528/68; 428/364; 428/394

[58] Field of Search .......... 525/410; 528/68, 51, 528/64, 61; 428/364, 394; 264/205, 331.19, 210.8, 211.14

[56] References Cited

U.S. PATENT DOCUMENTS

| | | | |
|---|---|---|---|
| Re. 29,623 | 5/1978 | Oertel | 528/64 |
| 2,929,804 | 3/1960 | Steuber | 260/77.5 |
| 3,180,854 | 4/1965 | Schneider | 528/61 |
| 3,428,711 | 2/1969 | Hunt | 525/127 |
| 3,642,703 | 2/1972 | Suzuki | 528/61 |
| 4,296,174 | 8/1981 | Hanzel | 428/394 |
| 4,590,285 | 5/1986 | Ernst | 549/429 |
| 4,590,312 | 5/1986 | Ernst | 568/861 |
| 4,772,677 | 9/1988 | Kausch | 528/61 |
| 4,798,880 | 1/1989 | Lodoen | 528/61 |

FOREIGN PATENT DOCUMENTS 1118733 7/1968 United Kingdom .

OTHER PUBLICATIONS

"Polyurethanes from Copolymers of Tetrahydrofuran", *Product Licensing Index*, Research Disclosures, 8810 (Aug. 1971).

Chiang & Rhodes, "Polymerizability of 3-Methyltetrahydrofuran", Polymer Letters, V. 7, pp. 643–649 (1969).

*Primary Examiner*—Lewis T. Jacobs
*Assistant Examiner*—David Buttner

[57] ABSTRACT

A elastic fibers are formed from spandex polymer that is prepared by reacting a glycol prepared from a tetrahydrofuran/3-methyltetrahydrofuran copolymer with a diisocyanate and then chain extending the thusly capped glycol with a particular mixture of diamines. The fibers have a highly desirable combination of power, hot-wet creep and heat-set efficiency and can be prepared at high spinning and windup speeds.

5 Claims, No Drawings

SPANDEX FIBER WITH COPOLYMER SOFT SEGMENT

BACKGROUND OF THE INVENTION

1. Field of the Invention

This invention relates to a dry-spun elastic fiber made of a polyurethane-urea spandex polymer which has its soft segments derived from a copolymer of tetrahydrofuran and 3-methyltetrahydrofuran. In particular, the invention concerns such a fiber prepared from a spandex polymer that was derived from an isocyanate-capped glycol of the copolymer which had been chain extended with a mixture of diamines. The fiber of the invention has an unusually desirable combination of power, elongation, heat-set efficiency and hot-wet creep.

2. Description of the Prior Art

Elastic fibers made from polyether-based polyurethane-urea spandex polymers are well known for their resistance to hydrolysis and desirable properties of stretch, recovery and power. Product Licensing Index, Research Disclosures, item 8810 (August 1971) discloses such a spandex fiber, in which the polyether soft segment is derived from copolymers of tetrahydrofuran ("THF") and 3-methyltetrahydrofuran ("3-MeTHF"). The hydroxyl-terminated copolyethers from which the spandex polymer is made contain 4 to 20 mole % 3-MeTHF of 650 to 4,500 (preferably 2,400 to 3,800) molecular weight. Specifically disclosed is a copolymer of 3,300 MW containing 14% 3-MeTHF. Also disclosed are (a) "capped glycols" of 4,000 to 12,000 molecular weight, (b) diisocyanate capping agents, 2,4-tolylene diisocyanate, p,p'-methylenediphenyl diisocyanate, and 4,4'-methylenedicyclohexyl diisocyanate and (c) one or more conventional diamine chain extension agents, (e.g., ethylenediamine, propylenediamine and xylylenediamine. The thusly prepared segmented polymers contain 10 to 30% hard segments and are conveniently prepared in solvents such as dimethylformamide or dimethylacetamide for wet or dry spinning. The copolyether spandex fibers are stated to possess low hysteresis (i.e., small difference between stretch and recovery forces), good resistance to hydrolysis, and an improved combination of elongation and tenacity, as compared to similar fibers prepared from THF homopolymer.

Yarns made from the polymers specifically disclosed in the Product Licensing Index item discussed in the preceding paragraph, suffer from poor heat-setting characteristics which cause problems in the heat setting of certain fabrics and yarns which include the spandex fibers. The spandex fibers have a low heat-set efficiency. Yarns made with the fibers require long times and high temperatures for heat setting. In fabrics which include nylon fibers as well as such spandex fibers, high heat setting temperatures often lead to nonuniformities in the fabrics. Such yarns also often have low break strength, which can lead to difficulties in textile processing of the yarns into fabrics or to premature failure of the fabric during wear. Such difficulties and failures would be especially apparent with yarns having fine denier spandex filaments, such as are used in women's hosiery and swim suits. Thus, there is a need in the trade for such polyether-based spandex yarns that, in addition to their known advantageous characteristics, also possess good heat-setting properties at lower temperatures.

SUMMARY OF THE INVENTION

The present invention provides an improved elastic fiber made from copolyether-based spandex polymer. The polymer has soft and hard segments and is derived from a hydroxyl-terminated copolymer of tetrahydrofuran and 3-methyltetrahydrofuran which was capped with an organic diisocyanate and then chain extended with diamine. The improvement of the present invention, comprises the chain extenders being a mixture of two diamines, the first diamine being selected from ethylenediamine, 1,3-propylene diamine and 1,4-cyclohexylene diamine and the second diamine being a coextender selected from 2-methylpentamethylene diamine and hydrogenated m-phenylenediamine, the concentration of the coextender in the mixture of diamines being in the range of 20 to 50 mole percent, and the hard segment amounting to 5.5 to 9 weight percent of the polymer.

The invention also includes a process for producing fibers from the above-described THF/3-MeTHF copolyether-based spandex polymer which comprises dry spinning the filaments at a speed of at least 400 m/min and winding them up at a speed of at least 500 m/min.

DETAILED DESCRIPTION OF PREFERRED EMBODIMENTS

As use herein, the term "spandex" has its usual definition; that is, a long chain synthetic polymer that comprises at least 85% by weight segmented polyurethane. The terms "soft segment" and "hard segment" refer to specific portions of the spandex chain. Soft segments are the copolyether portions of the polyurethane-urea polymer chain and hard segments are the portions that are derived from the reaction of an isocyanate and a diamine chain extender. The isocyanate end-group content of a polymer is referred to as the NCO content. "Molecular weight" means number average molecular weight. "Fiber" includes staple fibers and continuous filaments.

Several abbreviations are used herein. They have the following meanings:

| | |
|---|---|
| THF | tetrahydrofuran |
| 3-MeTHF | 3-methyltetrahydrofuran |
| HMPD | hydrogenated m-phenylenediamine |
| MPMD | 2-methylpentamethylene diamine |
| EDA | ethylenediamine |
| PDA | 1,3-propylene diamine |
| CHDA | 1,4-cyclohexylene diamine |
| MDI | p,p'-methylenediphenyl diisocyanate |
| TDI | 2,4-tolylene diisocyanate |
| PICM | 4,4'-methylene-bis(cyclohexylisocyanate) |
| DMAc | dimethylacetamide |

The fiber of the present invention usually is produced by dry-spinning of the copolyether-based polyurethane-urea spandex polymer from a solution of the polymer in conventional spandex polymer solvents (e.g., DMAc). The polymer is prepared by reacting an organic diisocyanate with THF/3-MeTHF copolyether glycol, at a mole ratio of diisocyanate to glycol in the range of 1.6 to 2.3, preferably 1.8 to 2.0, to produce a "capped glycol". The capped glycol is then reacted with a mixture of diamine chain extenders. In the resultant polymer, the soft segments are the copolyether/urethane parts of the polymer chain. These soft segments exhibit melting temperatures of lower than 60° C. The hard segments are the polyurethane/urea parts of the polymer chains; these have melting temperatures of higher than 200° C. The hard segments amount to 5.5 to 9%, preferably 6 to 7.5%, of the total weight of the polymer.

Glycol suitable for use in producing the spandex polymer for fibers of the present invention, is derived from a copolyether of THF and 3-MeTHF. The copolyether contains in the range of 4 to 20 mole percent of 3-MeTHF, preferably 10 to 17%. The copolyether glycol has a molecular weight within the range 2,000 to 6,000, preferably 3,000 to 4,000. The copolyethers may be produced by the general methods disclosed by Ernst, U.S. Pat. No. 4,590,285 and 4,590,312, the entire disclosures of which are hereby incorporated herein by reference. Alternatively, the copolyethers may be produced by polymerization of THF and 3-MeTHF with fluorosulphonic acid (HFSO$_3$) as catalyst in accordance with the general techniques disclosed in the Product Licensing Index item referred to hereinbefore. Generally, when the concentration of 3-MeTHF in the copolyether is less than 4 mol %, the benefits in hysteresis, elongation and power, usually associated with fibers made from spandex fibers having THF/3-MeTHF soft segments, are not obtained. Concentrations of greater than 20 mol % 3-MeTHF in the copolyether are more costly and because of difficulties in carrying out the polymerization.

Organic diisocyanate suitable for producing the spandex polymer of the fibers of the present invention include conventional diisocyanates, such as methylene-bis(4-phenylisocyanate) (MDI), 2,4-tolylene diisocyanate, 4,4'-methylene-bis(cyclohexylisocyanate), isophorone diisocyanate, tetramethylene-p-xylylene diisocyanate, and the like. MDI is preferred.

A mixture of chain extenders is used for producing the spandex polymer of the fibers of the present invention. The mixture must include (a) a diamine selected from ethylenediamine (EDA), 1,3-propylenediamine and 1,4-cyclohexanediamine and (b) a diamine coextender selected from hydrogenated m-phenylenediamine (HPMD), 2-methylpentamethylene diamine (MPMD) and 1,2-propylene diamine.

In accordance with the present invention, the diamine mixture contains from 20 to 50, preferably 30 to 45 mole percent, of the MPMD or HMPD diamine coextender. Such high contents of coextender are unusual. In the past, when diamine coextenders were employed in elastomers, the usual amount of coextender typically was in the range of 10 to 20%. High concentrations of coextender, such as those employable with the present invention, were believed to have detrimental effects on the hot-wet creep, and tenacity of resultant elastomers. However, as shown hereinafter in the examples, high concentrations of coextender in the specific diamine mixtures used for making the copolyether-based spandex fibers of the present invention have very favorable effects on tenacity and set characteristics of the fibers without adverse effects on creep, especially for fibers spun at high speeds. Below a concentration of 20 mol % coextender in the THF/3-MeTHF copolyether-based spandex fibers of the invention, tenacity is low and decreases with spinning speed and heat-set efficiency is lower than desired.

The total amount of diamine chain extenders used to make spandex polymer suitable for the fibers of the present invention must be sufficient to produce hard segments that amount to 5.5 to 9%, preferably 6 to 7.5%, of the total weight of the spandex polymer. When the amount of hard segment exceeds 9%, the spandex polymer is difficult to dissolve in the solvent from which the fibers are to be dry spun and the fibers made from such polymer lack in elongation. When the hard segment amounts to less than 5.5%, the spandex polymer is hardly fiber-forming and any fibers that can be made with such polymer have low recovery power and undergo excessive permanent set when stretched.

The present invention also includes a process for preparing the spandex fibers. The spandex polymer is formed in a conventional solvent from a hydroxyl-terminated copolymer of the tetrahydrofuran and 3-methyltetrahydrofuran containing 4 to 20 mole percent of the 3-methyltetrahydrofuran. The copolyether glycol is capped with p,p'-methylenediphenyl diisocyanate, 2,4-tolylene diisocyanate or 4,4'-methylenedicyclohexyl diisocyanate, with the molar ratio of diisocyanate to glycol being in the range of 1.6 to 2.3, preferably 1.8 to 2.0. The capped glycol is then chain extended with the mixture of two diamines. The first diamine is ethylenediamine (the preferred first amine), or 1,3-propylene diamine or 1,4-cyclohexylene diamine. The second diamine, a coextender, is 2-methylpentamethylene diamine or hydrogenated m-phenylenediamine. The 2-methylpentamethylene coextender is preferred. The coextender amounts to 20 to 50, preferably 30 to 45 mole percent, of the diamine mixture. The polymer solution is then dry spun through orifices to form filaments. The filaments are pulled at a speed of at least 400 meters per minute (preferably at least 600 m/min) and then wound up at a speed of at least 500 meters per minute (preferably at least 750 m/min). Such high speeds are unusual for the production of dry-spun spandex fibers. As shown in the examples below, spandex yarns of the invention having a desirable combination of properties can be wound up at speeds of 900 m/min or higher.

Yarns formed from elastic fibers made in accordance with the present invention generally have a tenacity at break of at least 0.6 g/dtex, a break elongation of at least 400%, an unload power at 300% elongation of at least 27 mg/dtex, a heat-set efficiency of at least 70% and a hot-wet creep of no greater than 65%.

The various characteristics and properties mentioned in the preceding discussion and in the Examples below were determined by the following methods.

The concentration of the hard segment in the polymer is calculated by the following formula, in 30 accordance with P. J. Flory, *Journal of American Chemical Society*, Vol. 58, pp. 1877–1885 (1936):

$$\% \text{ Hard Segment} = \frac{100(R - 1)(M_{di} + M_{da})}{(M_g + R(M_{di}) + (R - 1)(M_{da})}$$

wherein
  M is a number average molecular weight,
  R is the mole ratio of isocyanate to glycol
  Subscript "g" refers to glycol,
  Subscript "di" refers to diisocyanate and
  Subscript "da" refers to the diamines (mole average molecular weight).

Glycol molecular weight (number average) is determined from the hydroxyl number of the polyether diol, which is measured by the imidazole-pyridine catalyst method described by S. L. Wellon et al, "Determination of Hydroxyl Content of Polyurethane Polyols and Other Alcohols", Analytical Chemistry Vol. 52, No. 8, pp. 1374–1376 (July 1980).

The NCO content of isocyanate-capped polycarbonate was measured by the method of S. Siggia, "Quantitative Organic Analysis via Functional Group", 3rd Edition, Wiley & Sons, New York, pages 559–561 (1963).

Strength and elastic properties of the spandex filaments are measured in accordance with the general method of ASTM D 2731-72. Three threads, a 2-inch (5-cm) gauge length and a zero-to-300% elongation cycle are used for each measurement. The samples are cycled five times at an constant elongation rate of 800% per minute. Load power, $P_{100}$ and $P_{300}$, respectively, are measured on the load portion of the first cycle as the fiber is extended to 100% and 300% of its unstressed length. Unload power, $UP_{300}$ and $UP_{100}$, respectively are measured on the unload portion of the fifth cycle as the fiber is contracted from 300% and 100% of its unstressed length. Load power and unload power are expressed in milligrams per original unstretched dtex. After completion of the fifth cycle the fiber is extended to break to measure elongation, $E_b$, and tenacity, $T_b$, which are expressed as percent of unstretched original length and grams per original dtex, respectively.

Heat-set efficiency, HSE, is measured on samples that are stretched and kept at one-and-a-half times their original length, heated at 195° C. for 60 seconds, relaxed and then immersed in boiling water for 30 minutes. The percent heat-set efficiency is then calculated as:

$$\% HSE = 100 (L_r - L_o) = 200 (L_r - L_o)/L_o$$

where $L_o$ is original thread length, $L_o$ is the thread length after the thread has been extended to 1.5 times its original length (i.e., $1.5L_o$) and $L_r$ is the thread length after the exposure in the boiling water. The higher the heat-set efficiency, the easier it is to heat set the fiber.

Hot-wet creep (HWC) is determined by measuring an original length, $L_o$, of a yarn, stretching it to three times its original length ($3L_o$), immersing it in its stretched condition for 30 minutes in a water bath maintained at temperature in the range of 97 to 100° C., removing it from the bath, releasing the tension and allowing the sample to relax at room temperature for 30 minutes before measuring the final length, L. The percent hot-wet creep is calculated from the formula:

$$\% HWC = 100 (L - L_o)/L_o$$

Fibers with low % HWC provide superior performance in hot-wet finishing operations, such as dyeing.

EXAMPLE 1

This example demonstrates the advantageous properties of THF/3-MeTHF copolyether-based spandex fibers of the invention made with a mixture of diamine chain extenders (Yarns 1 and 2) over similar yarns prepared from spandex polymer that was the same except for having been chain-extended with only one amine (Comparison Yarns A and B). Yarn 1 and Comparison A were dry spun at conventional speeds. Yarn 2 and Comparison B were dry spun at relatively high speeds. A copolyether glycol of about 3,350 molecular weight was prepared from THF and 3-MeTHF (3-MeTHF content 15 mole %) in accordance with the general procedures of Ernst, U.S. Pat. No. 4,590,312, column 3, lines 13-27. The copolyether glycol was mixed with MDI in a ratio of 1.85 moles of MDI per mole glycol and heated for about 95 minutes at about 90° C. to yield an isocyanate-terminated copolyether (i.e., "capped glycol") having 1.8 wt.% NCO content. The capped glycol was cooled and added to DMAc to give a mixture containing about 50% solids. The mixture was thoroughly agitated for about 10 minutes. Then, while the solution was still being agitated, additions were made of (1) a stoichiometric amount of a mixture consisting of 60 mole percent EDA and 40 mole percent MPMD in additional DMAC and (2) about 7 mole percent diethylamine (based on total diamines) in DMAC. The resulting solution of segmented copolyether polyurethane-urea polymer contained approximately 35% solids (by weight) and had a viscosity of about 2400 poises at 40° C. The polymer had an intrinsic viscosity of 0.95, measured at 25° C. in DMAc at a concentration of 0.5 grams/100ml of solution.

To the viscous polymer solution were added 1,3,5-tris(4-tert-butyl-3-hydroxy-2,6-dimethylbenzyl) -1,3,5-triazine-2,4,6-(1H,3H,5H)-trione and a diisopropylaminoethylmethacrylate/decylmethacrylate (70:30 weight ratio) copolymer of the type disclosed in Hunt, U.S. Pat. No. 3,428,711. The two additives respectively amounted to 1.5% and 2% by weight of the total solids in the solution. The solution was dry spun by conventional methods to form 44-dtex, 4-filament coalesced yarns. The filaments were pulled from the spinneret by conventional puller rolls at a speed of 440 meters per minute and were wound onto a cylindrical core at 585 m/min. The thusly formed yarn was designated Yarn 1.

A comparison yarn, Yarn A, was made in a similar manner to Yarn 1, except that the chain extender was 100% EDA instead of the EDA/MPMD mixture.

The above-described procedures were repeated with a puller roll speed was 710 m/min instead of 440 m/min and a windup speed was 945 m/min instead of 585 m/min, to form for Yarn 2 of the invention, and comparison Yarn B. Note that such higher spinning speeds are unusual for the production of satisfactory spandex fibers.

Table I below summarizes properties of the yarns. The table shows that the unload power of yarns of the invention is greater than that of the comparison yarns, especially at the higher windup speed. Note especially the improvement in heat-set efficiency, 88% versus 74% for Yarn 1 versus Comparison A and 84% versus 64% for Yarn 2 versus Comparison B. These data indicate that the yarns of the invention can be heat set at the temperatures and residence times that are usually used commercially for yarn mixtures that contain 6-nylon fibers. The data also indicate that the presence of coextender in the polymer has little adverse effect, if any, on the hot-wet creep properties of the spandex yarns. Thus, fabrics made with such yarns of the invention can be hot-wet finished without unacceptable loss in yarn power.

The data in Table I for the yarns made at higher windup speeds show that yarns of the invention are considerably improved in tenacity over the comparison yarns (0.71 versus 0.40 g/dtex for Yarn 2 versus comparison Yarn B). In the past, it was believed that the use of coextender would have little, if any, effect on tenacity. The data also indicate that the difference in break elongation between the yarns of the invention and the comparison yarns is less at the higher windup speed than at the slower windup speed.

TABLE I

|  | Yarn 1 | Comparison A |
|---|---|---|
| Windup Speed, m/min | 585 | 585 |
| Power, mg/dtex |  |  |
| $P_{100}$ | 41 | 46 |
| $P_{300}$ | 84 | 86 |
| Unload Power, mg/dtex |  |  |
| $UP_{100}$ | 18 | 16 |
| $UP_{300}$ | 27 | 25 |
| Tenacity, g/dtex | 0.64 | 0.58 |
| Break Elongation, $E_b$, % | 555 | 690 |
| Heat-set efficiency, % | 88 | 74 |
| Hot-Wet Creep | 72 | 67 |

|  | Yarn 2 | Comparison B |
|---|---|---|
| Windup Speed, m/min | 945 | 945 |
| Power, mg/dtex |  |  |
| $P_{100}$ | 50 | 59 |
| $P_{300}$ | 128 | 126 |
| Unload Power, mg/dtex |  |  |
| $UP_{100}$ | 18 | 15 |
| $UP_{300}$ | 29 | 24 |
| Tenacity, g/dtex | 0.71 | 0.40 |
| Break Elongation, $E_b$, % | 478 | 503 |
| Heat-set efficiency, % | 84 | 64 |
| Hot-Wet Creep | 64 | 62 |

Additional yarns of the invention were made by repeating the above-described procedures (a) with the MPMD replaced by hydrogenated m-phenylenediamine (HMPD), (b) with the EDA replaced by 1,3-propylenediamine and (c) with the EDA replaced by 1,4-cyclohexylene diamine. In each case, most of the above-noted benefits of yarns of the invention were evident. However, yarns of the invention made with MPMD coextender is the polymer exhibited the most favorable yarn properties.

EXAMPLE 2

Example 1 was repeated with copolyether glycol of about 3100 molecular weight containing 11.5% 3-MeTHF. The glycol was capped with MDI in a mole ratio of 1.98 to give 2.3% NCO. The capped glycol was then reacted with a mixture containing 80 mole % EDA and 20% HMPD. A 44-dtex 4-filament yarn (Yarn 3) was dry spun and wound up at 945 m/min. A comparison yarn (Yarn C) was prepared in a like manner, except that EDA was used as the only diamine extender. Another yarn of the invention (Yarn 4) was similarly prepared with a 70/30 EDA/MPMD amine extender. Table II summarizes the properties of the yarns.

TABLE II

|  | Yarn 3 | Yarn 4 | Yarn C |
|---|---|---|---|
| Diamines | EDA/HMPD | EDA/MPMD | EDA |
| % coextender | 20 | 30 | 0 |
| Power, mg/dtex |  |  |  |
| $P_{100}$ | 71 | 64 | 77 |
| $P_{300}$ | 161 | 154 | 156 |
| Unload Power |  |  |  |
| $UP_{100}$ | 17 | 17 | 14 |
| $UP_{300}$ | 29 | 28 | 24 |
| $T_b$, g/dtex | 0.68 | 0.71 | 0.41 |
| $E_b$, % | 463 | 459 | 450 |
| % HSE | 70 | 76 | 66 |
| % HWC | 58 | 49 | 63 |

As in Example 1, these data also show that the tenacity and heat-set efficiency of yarns of the invention are improved by the presence of coextender in polymer according to the invention without an adverse effect on hot-wet creep properties of the yarns.

I claim:

1. In a dry-spun elastic fiber of polyether-based polyurethane-urea spandex polymer having soft and hard segments, the polymer being the product of a hydroxyl-terminated copolymer of tetrahydrofuran and 3-methyltetrahydrofuran that was capped with p,p'-methylene diphenyl diisocyanate and then chain-extended with diamine, the improvement comprising the hydroxyl-terminated copolymer containing 4 to 20 mole percent of 3-methyltetrahydrofuran, the chain extenders being a mixture of ethylene diamine and 2-methylpentamethylene diamine coextender, the coextender amounting to 20 to 50 mole percent of the diamine mixture, and the hard segment amounting to 5.5 to 9 mole percent of the polymer.

2. An elastic fiber in accordance with claim 1 wherein the 2-methylpentamethylene diamine amounts to 30 to 45 mole percent of the diamine mixture, and the hard segments amount to 6 to 7.5 percent of the polymer weight.

3. In a process for preparing spandex fibers wherein the spandex polymer is formed in an organic solvent from a hydroxyl-terminated copolymer of tetrahydrofuran and 3-methyltetrahydrofuran containing 4 to 20 mole percent 3-methyltetrahydrofuran, which was capped with p,p'-methylene diphenyl diisocyanate and then chain extended with diamine and the polymer is then dry spun through orifices to form the elastic fibers, the improvement comprising the molar ratio of diisocyanate to glycol being in the range of 1.6 to 2.3, the capped glycol being chain extended with a mixture of ethylene diamine and 2-methylpentamethylene diamine coextender, the coextender amounting to 20 to 50 mole percent of the diamine mixture to provide spandex polymer having hard segments amounting to 5.5 to 9 mole percent of the polymer, pulling the dry-spun filaments at a speed of at least 400 m/min and winding up the filaments at a speed of at least 500 m/min.

4. A process in accordance with claim 3 wherein the molar ratio of diisocyanate to glycol is in the range of 1.8 to 2.0, the 2-methylpentamethylene diamine coextender amounts to 30 to 45 mole % of the diamine mixture, the pulling speed is at least 600 m/min and windup speed is at least 750 m/min.

5. A process in accordance with claim 4 wherein the windup speed is at least 900 m/min.

* * * * *